(12) United States Patent
Lim

(10) Patent No.: US 9,128,329 B2
(45) Date of Patent: Sep. 8, 2015

(54) APPARATUS FOR FABRICATING ALIGNMENT FILM FOR IMPROVING ALIGNMENT FORCE OF A LIQUID CRYSTAL AND METHOD FOR FABRICATING LIQUID CRYSTAL DISPLAY PANEL USING THE SAME

(75) Inventor: Young Nam Lim, Anyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 1154 days.

(21) Appl. No.: 11/301,677

(22) Filed: Dec. 13, 2005

(65) Prior Publication Data
US 2006/0290856 A1    Dec. 28, 2006

(30) Foreign Application Priority Data
Jun. 23, 2005    (KR) .................. 10-2005-0054691

(51) Int. Cl.
*G02F 1/1337* (2006.01)
(52) U.S. Cl.
CPC ............................. *G02F 1/133788* (2013.01)
(58) Field of Classification Search
USPC ........................................................ 349/125
See application file for complete search history.

(56) References Cited

U.S. PATENT DOCUMENTS

| | | | | |
|---|---|---|---|---|
| 5,438,421 A * | 8/1995 | Sugawara et al. | ............. | 349/123 |
| 5,739,883 A * | 4/1998 | Chen et al. | .................... | 349/124 |
| 5,796,458 A * | 8/1998 | Koike et al. | .................... | 349/126 |
| 2001/0048499 A1* | 12/2001 | Numano et al. | ............. | 349/123 |
| 2005/0237471 A1* | 10/2005 | Kawamura | .................... | 349/158 |

FOREIGN PATENT DOCUMENTS

| JP | 2004-191490 | 7/2004 |
|---|---|---|
| KR | 10-2004-0005521 | 1/2004 |

OTHER PUBLICATIONS

Office Action issued in corresponding Korean Patent Application No. 10-2005-0057108, mailed Jul. 25, 2011.

* cited by examiner

*Primary Examiner* — Lauren Nguyen
(74) *Attorney, Agent, or Firm* — Brinks Gilson & Lione

(57) ABSTRACT

An alignment film and method of fabricating the alignment film are disclosed. A photosensitive alignment material is spread on an LCD array substrate or color filter substrate and partially cured. A soft mold is aligned on the partially cured alignment material. The soft mold has a concavo-convex pattern with grooves and projections. The alignment material is exposed to ultraviolet radiation through the soft mold and then developed. The differences between the indices of refraction of the soft mold and air cause interference in the ultraviolet radiation, leading to periodic variations in the exposure intensity of the alignment material. These variations result in crests and troughs being formed when the alignment film is developed. The developed alignment film is then cured.

24 Claims, 10 Drawing Sheets

APPARATUS FOR FABRICATING ALIGNMENT FILM FOR IMPROVING ALIGNMENT FORCE OF A LIQUID CRYSTAL AND METHOD FOR FABRICATING LIQUID CRYSTAL DISPLAY PANEL USING THE SAME

This application claims the benefit of the Korean Patent Application No. P2005-054691 filed on Jun. 23, 2005, which is hereby incorporated by reference.

TECHNICAL FIELD

A liquid crystal display panel is presented, and more particularly an alignment film fabrication method of the liquid crystal display panel is presented that prevents rubbing defects and improves an alignment force for aligning liquid crystal, and a fabricating method of a liquid crystal display panel using the same.

DESCRIPTION OF THE RELATED ART

Generally, a liquid crystal display (hereinafter, referred to as "LCD") controls light transmittance of liquid crystal cells in accordance with a video signal. The LCD displays a picture corresponding to the video signal in a liquid crystal display panel where the liquid crystal cells are arranged in a matrix. To this end, the liquid crystal display device includes a liquid crystal display panel and drive circuits for driving the liquid crystal display panel.

Examples of liquid crystal display devices are a twisted nematic (TN) mode device and an in-plane switch (IPS) mode device. In the TN mode device, a vertical electric field is established between opposing substrates to drive the liquid crystal disposed therebetween. In the TN mode device, a voltage difference is applied between a pixel electrode on one substrate and a common electrode on the opposing substrate. The TN mode device has a high aperture ratio but a narrow viewing angle. In the IPS mode device, the pixel electrode and the common electrode are arranged parallel to each other on only one substrate. Accordingly, the electric field in the IPS mode device is substantially parallel to the substrates. The IPS mode device has a wide viewing angle but a small aperture ratio.

FIG. 1 is a cross sectional diagram representing a TN mode liquid crystal display panel of the related art.

The liquid crystal display panel shown in FIG. 1 includes an upper array substrate (or color filter array substrate), a lower array substrate, and a liquid crystal 52 injected into an inner space between the upper array substrate and the lower array substrate. The color filter array substrate has a black matrix 4, a color filter 6, a common electrode 18 and an upper alignment film 8 sequentially formed on an upper substrate 2. The array substrate has a TFT, a pixel electrode 16 and a lower alignment film 38 formed on a lower substrate 32.

In the upper substrate, the black matrix 4 is formed on the upper substrate 2 in correspondence to an area of a gate line, a data line, and a TFT area of the array substrate to provide a cell area where a color filter 6 is to be formed. The black matrix 4 prevents light leakage and absorbs external light, thereby increasing the contrast of the cell area. The color filter 6 covers the black matrix 4 and the cell area. The color filter 6 has multiple colors (R, G, B) divided by the black matrix 4. The common electrode 18 is formed on the front surface of the upper substrate. When the liquid crystal is driven, a common voltage is applied to the common electrode 18. The spacer 13 maintains a cell gap between the upper substrate and the lower substrate.

In the lower array substrate, the TFT includes a gate electrode 9 formed on the lower substrate 2; a semiconductor layer 14, 42 overlapping the gate electrode 9 with a gate insulating film 44 therebetween; and a source/drain electrode 40, 47 formed on the semiconductor layer 14, 42. The TFT supplies a pixel signal from the data line to the pixel electrode 16 in response to a scan signal from the gate line.

The pixel electrode 16 is formed of a transparent conductive material with a high light transmittance and is in contact with a drain electrode 47 of the TFT. A passivation film 50 is formed under the pixel electrode 16. Upper/lower alignment films 8, 38 for aligning liquid crystal are formed by performing a rubbing process after spreading an alignment material such as polyimide, or are formed using ultraviolet radiation.

FIG. 2 is a diagram representing a method of forming an alignment film by a rubbing process of the related art.

Referring to FIG. 2, an alignment material 8a such as polyimide is formed on the upper substrate 2 where the common electrode 18, etc is formed. A physical rubbing process is then performed by using a rubbing device 60 having a rubbing cloth 62 to form the alignment film 8 having troughs A and crests B. The rubbing process that produces the alignment film 8 also generates polarization, which generates an interaction force with the liquid crystal. However, the rubbing cloth 62 also physically damages the alignment film 8, generating scratches, vertical lines, etc in the alignment film 8. Further, errors generated by mechanical vibration, oscillation, etc of the rubbing device 60 also deteriorate the contrast ratio.

FIG. 3 is a diagram representing an alignment film formed by chemical alignment using ultraviolet radiation of the related art.

Referring to FIG. 3, after a photosensitive alignment material 8a is formed on the upper substrate 2 where the common electrode 18, etc are formed, polarized ultraviolet (UV) radiation irradiates the alignment material 8a to cure the photosensitive alignment material 8a, thereby forming a chemically-transformed film 8b on the photosensitive alignment material 8a. The chemically-transformed film 8b aligns the liquid crystal in a designated direction. While this chemical alignment process does not cause physical damage to the alignment film 8, the interaction force of the alignment film 8 with the liquid crystal is low since the alignment film 8 does not have troughs and crests. As a result, the degree of alignment of the liquid crystal is low, thereby resulting in generation of a residual image in the screen.

SUMMARY

By way of introduction only, in one embodiment, an apparatus for fabricating an alignment film is described. The apparatus contains a dispensing device that covers a substrate having a thin film pattern with a photosensitive alignment material, a soft mold which is aligned on the alignment material and has a concavo-convex pattern, a light irradiation device operative to expose the alignment material to ultraviolet radiation through the soft mold, and a developing device operative to form an alignment film by developing and patterning the exposed alignment material.

In another embodiment, a method of fabricating an alignment film is described. The method includes spreading a photosensitive alignment material on a substrate containing a thin film pattern. The alignment material is partially cured after being spread on the substrate. A soft mold having a concavo-convex pattern is aligned on the alignment material. The alignment material is exposed to ultraviolet radiation by irradiating the alignment material with the ultraviolet radiation through the soft mold. The exposed alignment material is developed and cured to form the alignment film.

In another embodiment, a method of fabricating a liquid crystal display is described. The method includes providing an LCD color filter or array substrate with a plurality of layers disposed thereon and spreading a photosensitive alignment material on the first substrate. The alignment material is partially cured after being spread on the first substrate. A soft mold having a concavo-convex pattern is aligned on the alignment material. The alignment material is exposed to ultraviolet radiation by irradiating the alignment material with the ultraviolet radiation through the soft mold. The exposed alignment material is developed and cured to form the alignment film. Another LCD color filter or array substrate is provided and the first and second substrates are combined to form a liquid crystal display having liquid crystal disposed therein.

BRIEF DESCRIPTION OF THE DRAWINGS

The following detailed description of the embodiments reference to the accompanying drawings, in which.

DETAILED DESCRIPTION OF THE PREFERRED EMBODIMENTS

Figure 1:
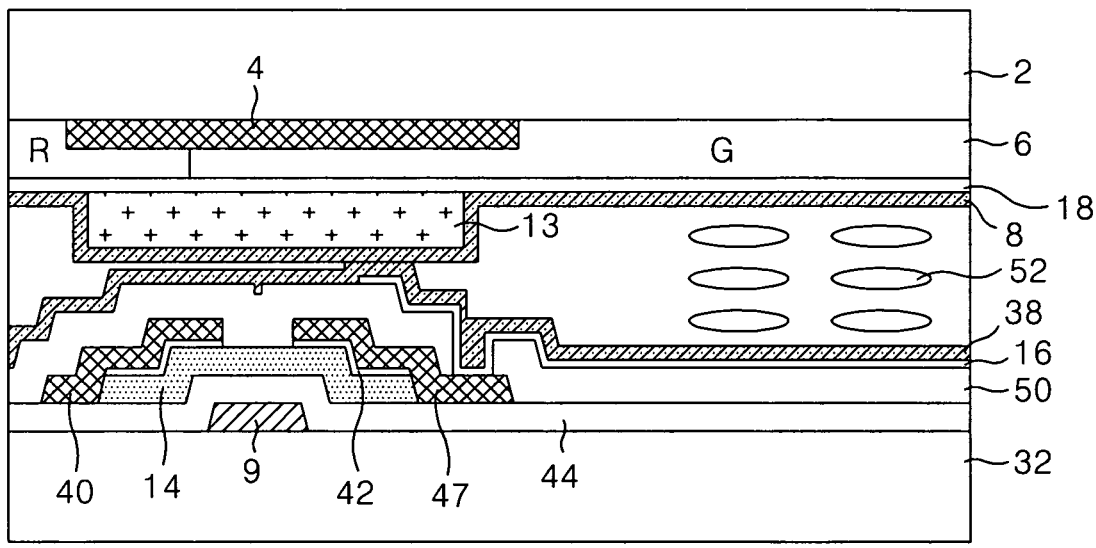
FIG. 1 is a cross sectional view of a liquid crystal display panel of the related art.
Figure 2:
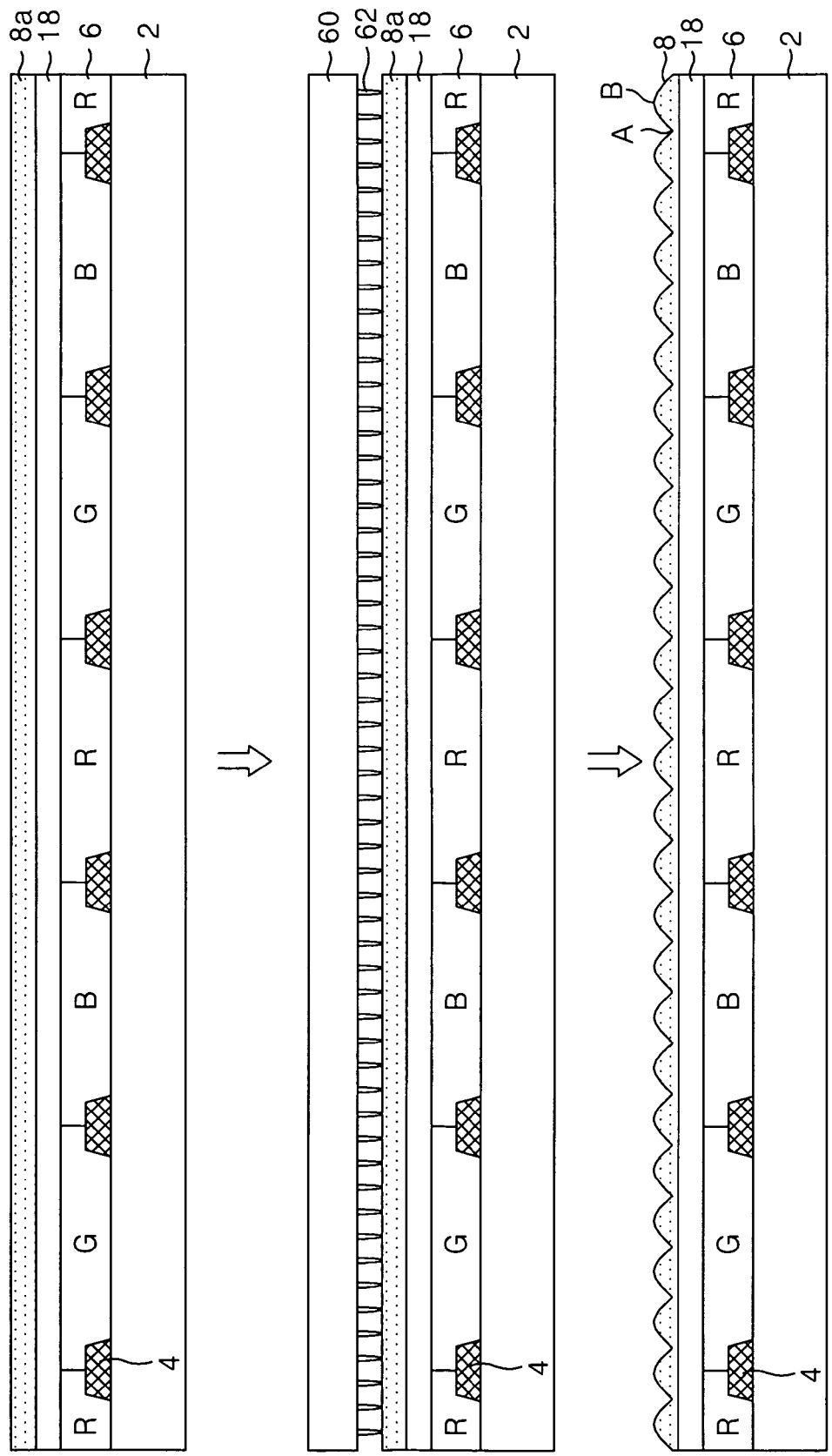
FIG. 2 shows conventional formation of an alignment film by a rubbing process.
Figure 3:
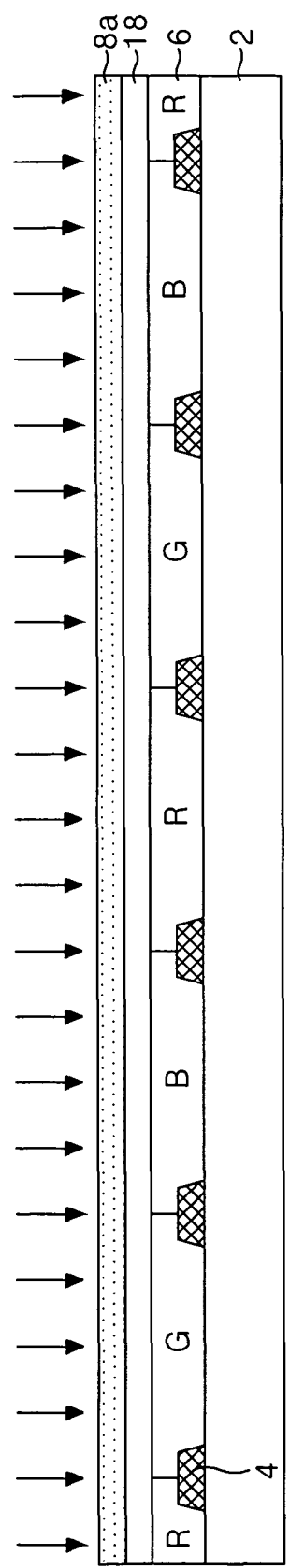
FIG. 3 shows conventional formation of an alignment film using ultraviolet radiation.
Figure 3:
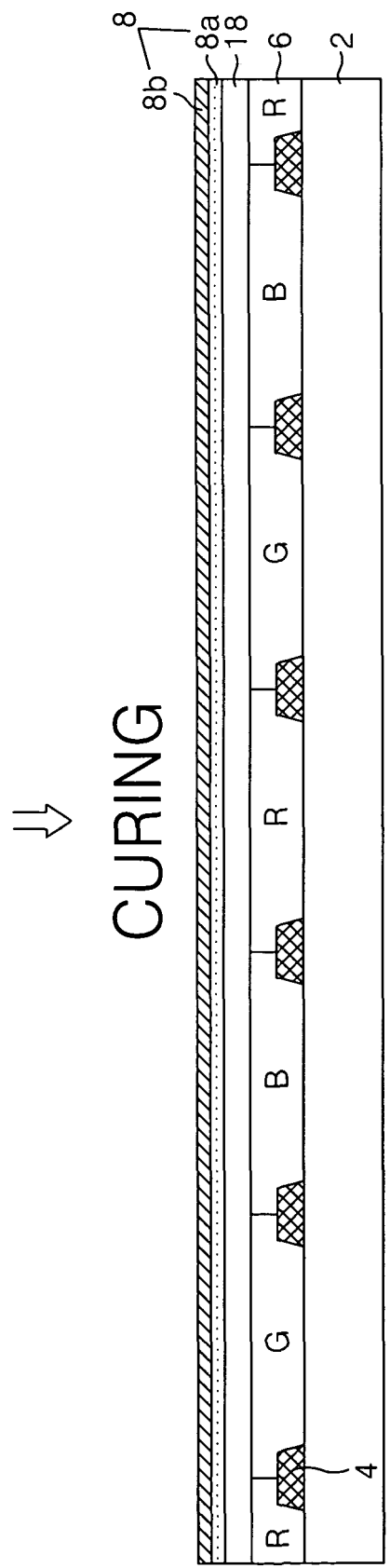
Figure 4:
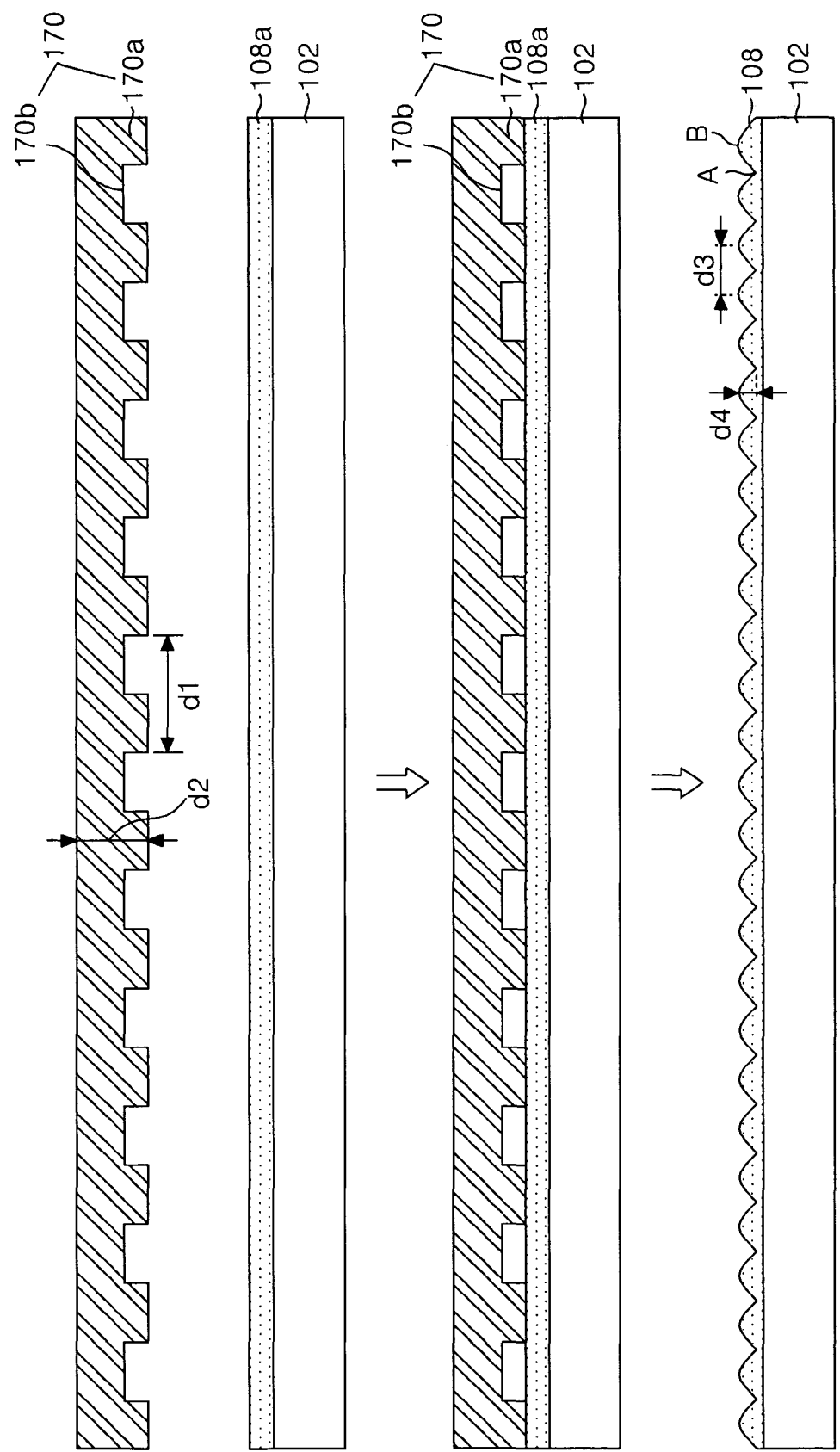
FIG. 4 shows an apparatus and method of forming an alignment film according to an embodiment of the present invention.

Reference will now be made in detail to the preferred embodiments of the present invention, examples of which are illustrated in the accompanying drawings. With reference to FIGS. 4 to 7D, embodiments of the present invention will be explained as follows. FIG. 4 shows an apparatus and method of an alignment film of a liquid crystal display panel according to an embodiment of the present invention.

An alignment material 108a such as photosensitive polyimide, etc is formed on a substrate 102. The alignment material 108a is formed, for example, using an alignment material spreading device. After the alignment material 108a is formed on the substrate 102, a pre-curing process is performed using a curing device. The curing device can include an annealing stage in which the alignment material 108a is heated and/or an ultraviolet radiation device in which the alignment material 108a is exposed to ultraviolet radiation. In one particular example of the former, the pre-curing process is performed in an environment of about 150° C. for about 10 min.

After the alignment material 108a has been pre-cured, a soft mold 170 is aligned. The soft mold 170 contains a concavo-convex pattern having grooves 170b and projections 170a. The soft mold 170 is formed of a rubber material with high elasticity, e.g., poly dimethyl siloxane (PDMS), etc. In one example, a pitch (d1) of the concavo-convex pattern of the soft mold 170, i.e., of the distance between one of the grooves 170b and one of the projections 170a, is about 0.1 µm, and a thickness (d2) thereof is about 0.5 µm. External pressure may be applied to the soft mold 170 when contacting the alignment material 108a, or the alignment pattern 108 may be formed using only the weight of the soft mold 170. While the soft mold 170 contacts the alignment material 108a, the alignment material 108a is irradiated with ultraviolet radiation using a light irradiation device UV. The wavelength of the ultraviolet radiation may be, for example, about 250~340 nm, in particular about 310 nm.

Figure 5:
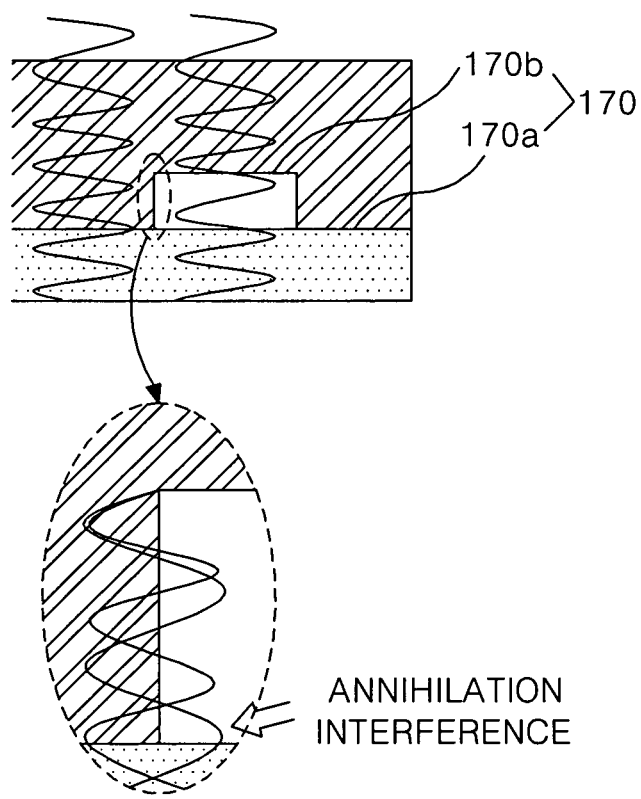
FIG. 5 shows transmission of UV radiation and interference at the portion of the alignment material corresponding to the border between the groove and projection of the soft mold.
Figure 6:
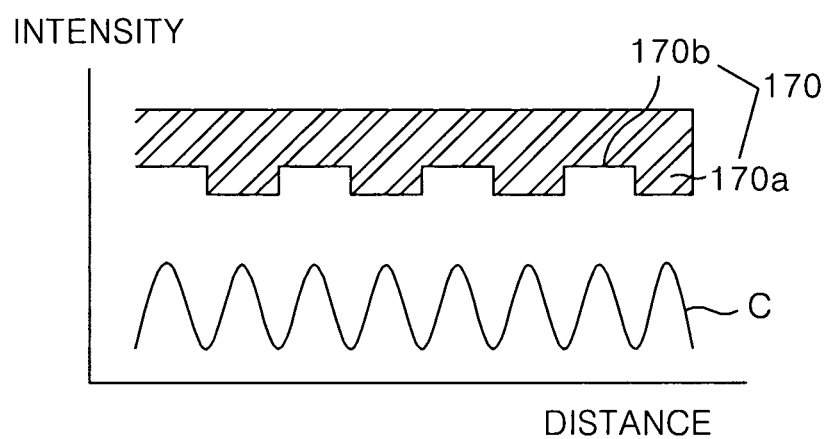
FIG. 6 illustrates exposure of the alignment material to ultraviolet radiation.

FIG. 5 illustrates the path of ultraviolet radiation which irradiates the alignment material 108a through the soft mold 170. Referring to FIG. 5, when the ultraviolet radiation is incident from the air to the soft mold 170, the radiation travels from a material with a lower index of refraction to a material with a higher index of refraction, thus decreasing the wavelength of the ultraviolet radiation. If the ultraviolet radiation passes through the groove 170b of the soft mold 170, the wavelength is lengthened since the groove 170b contains air. This generates interference between the different wavelengths in the area of the groove 170a and the projection 170a as shown. In the worst case, complete destructive interference (annihilation interference) results at the alignment material 108a along the projection of the border between the groove 170b and the projection 170a of the soft mold 170. The phase difference between the UV radiation in the different areas is shown at the projection of the boarder as overlapping waves traveling substantially along the same path in the inset of the figure. As a result, as shown in FIG. 6, a difference in the exposure intensity occurs between the border of the groove 170b and the projection 170a of the soft mold and the other areas. As shown by the exposure curve C, the intensity of the exposure is high in the area corresponding to the groove 170b and the projection 170a, but is relatively low at the edge of the groove 170b bordering the projection 170a.

Later curing the exposed alignment material 108a results in a material having different characteristics due to the different UV exposures. In one example, this later curing process is performed in an environment of about 200° C. for about one hour.

After the curing process, a developing process is provided using a developing device. The developing process uses developing solution such as a basic aqueous solution or deionized DI water. This results in an alignment film 108 formed in an embossed shape, as shown in FIG. 4. The embossed shape is the inverse of the shape of the exposure density curve C. That is to say, the troughs A of the alignment film 108 in FIG. 4 correspond to the grooves 170b and the projections 170a of the soft mold 170, and the crests B correspond to the border of the grooves 170 and the projections 170b of the soft mold 170. In the example shown in FIG. 4, a length d3 between an adjacent troughs A is about 40~100 nm, more particularly about 50 nm. Further, a depth d4 from the trough to the crest is about 1000~2000 Å. However, the pitch d1 of the soft mold 170, the length d3 between adjacent troughs A, and the depth d4 from the trough A to the crest B can be designed to have various lengths.

The soft mold 170 is formed using differences in the intensity of UV exposure, thereby preventing physical damage such as scratches, etc from being generated in the alignment film 108. Further, the soft mold 170 has troughs A and crests B, thereby increasing the interaction force with the liquid crystal. As a result, an alignment force for aligning the liquid crystal can be improved.

FIGS. 7A to 7D illustrate a fabricating method of a liquid crystal display panel that includes formation of the above-described alignment film.

Figure 7A:
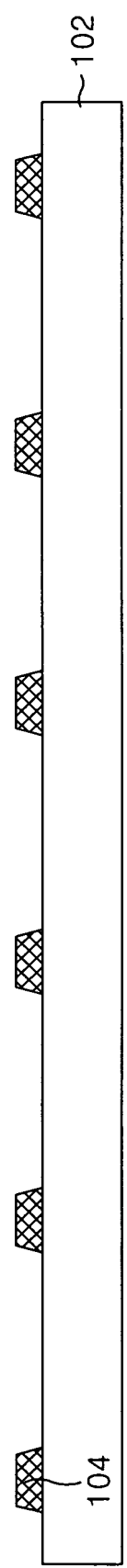
FIGS. 7A to 7D show a fabricating method of a liquid crystal display panel.

The entire surface of the upper substrate 102 is covered by an opaque material such as chrome Cr. A photoresist is spread over the entire surface of the upper substrate 102 containing the opaque material. The photoresist is patterned by photolithography using a mask, the opaque material is then wet or dry etched, and the photoresist removed, thereby forming a black matrix 104, as shown in FIG. 7A.

Figure 7B:
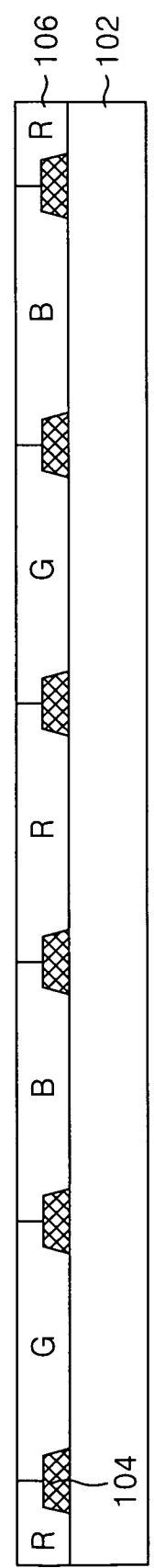

A red resin R is patterned using a similar photolithographic and etching process after depositing the red resin on the upper substrate 102 where the black matrix 104 is formed, thereby forming a red color filter R. Subsequently, a green resin G is patterned using the same processes after depositing the green resin on the upper substrate 102 where the red color filter R is formed, thereby forming a green color filter G. A blue resin B is then patterned the same way after depositing the blue resin on the upper substrate 102 where the green color filter G is formed, thereby forming a blue color filter B. Accordingly, the red, green, blue color filter 106 is formed, as shown in FIG. 7B.

Figure 7C:
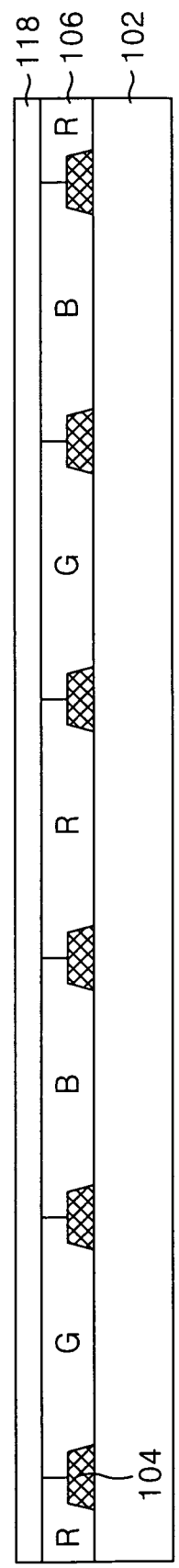
Figure 7D:
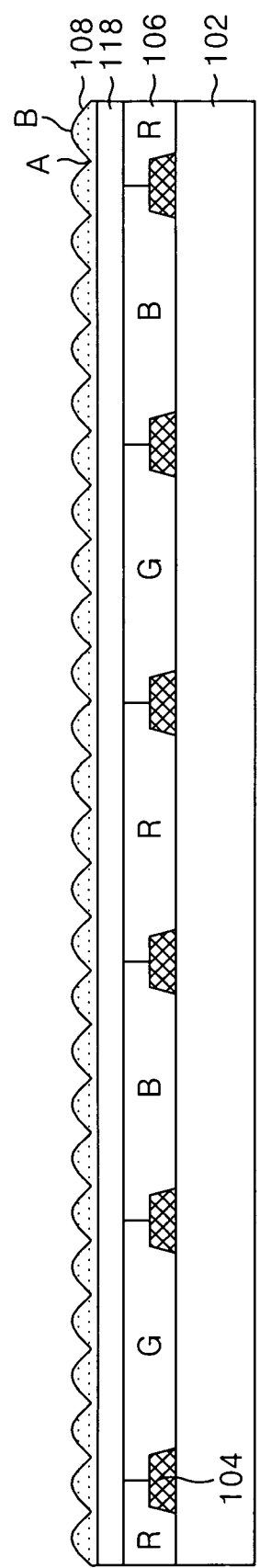

A common electrode 118, as shown in FIG. 7C, is formed on the upper substrate 102 where the color filter 106 is formed. After the common electrode 118 is formed, the alignment film 108 is formed as shown in FIG. 7D using the alignment film forming device and method of FIGS. 4 to 6.

Similarly, the alignment film can be formed on the array substrate. In this case, TFTs and signal lines such as gate and data lines are formed on the array substrate. The TFTs each contain a gate electrode, one or more single crystal, polycrystalline or amorphous semiconductor layers, a gate insulating layer between the gate electrode and the semiconductor layer, and source and drain electrodes contacting the semiconductor layer. A transparent conductive pixel electrode contacts (or is an extension of) the drain electrode. A passivation film and/or other insulating film(s) may be disposed between the pixel electrode and the drain electrode. In this case, the pixel electrode contacts the drain electrode through a contact hole in the passivation film and/or other insulating films. In addition, a common line and common electrodes may be formed to increase the capacitance and/or provide an IPS mode liquid crystal display. A spacer that maintains a cell gap between the array substrate and the color filter substrate may be formed on either substrate. Each of these various layers is formed using known processes such as photolithography, wet/dry etching, metallization, developing, cleaning, and other processes.

After formation of the alignment films, the array and color filter substrate can be combined and the liquid crystal injected therebetween, or the liquid crystal can be disposed on one of the substrates and the other substrate then combined with the substrate containing the liquid crystal. The combined structure is then cut into multiple displays of a desired size.

Formation of an alignment film using interference of applied ultraviolet radiation due to the differences between the refractive index of the soft mold and air can be easily applied to an IPS mode liquid crystal display panel, an ECB (electronically controlled birefringence) mode liquid crystal display panel, and a VA (vertical alignment) mode liquid crystal display panel, as well as a TN mode liquid crystal display panel. Thus, physical defects such as those caused by rubbing are not generated because the alignment film is not formed by a rubbing process while at the same time increasing the interaction force with the liquid crystal because the alignment film has the same structure as an alignment film formed by the rubbing process. As a result, the alignment force for aligning the liquid crystal is improved compared with formation using conventional UV techniques.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of fabricating an alignment film, the method comprising:
    spreading a photosensitive alignment material on a substrate containing a thin film pattern;
    aligning a soft mold on the alignment material without being pressed, the soft mold having grooves and projections formed by a concavo-convex pattern made of a same material through an entire area of which ultraviolet radiation is transmitted;
    irradiating an entire area of the alignment material with ultraviolet radiation through the entire area of the concavo-convex pattern of the soft mold, wherein the ultraviolet radiation travelling through borders between the grooves and the projections of the soft mold has an intensity lower than an intensity of the ultraviolet radiation travelling through other areas of the soft mold such that a portion of the alignment material exposed to the ultraviolet radiation passing through the borders between the grooves and the projections of the soft mold is developed to form crests and a remaining portion of the alignment material exposed to the ultraviolet radiation travelling through the other areas of the soft mold is developed to form troughs, and
    wherein each of the grooves of the soft mold has a flat shape in a horizontal direction and a predetermined constant depth in a vertical direction, each of the projections of the soft mold have a flat shape in the horizontal direction and a predetermined height in the vertical direction, and the predetermined constant depth is same as the predetermined height.

2. The fabricating method according to claim 1, further comprising:
    partially curing the alignment material after spreading the alignment material on the substrate; and
    completing curing of the alignment material after exposing the alignment material to the ultraviolet radiation to form the alignment film.

3. The fabricating method according to claim 1, wherein different areas of the alignment material are exposed to different ultraviolet radiation intensities.

4. The fabricating method according to claim 3, wherein the different intensities are caused by an interference pattern of the ultraviolet radiation due to the difference between the index of refraction of the soft mold and air.

5. The fabricating method according to claim 4, further comprising selecting a soft mold with an index of refraction such that complete destructive interference of the ultraviolet radiation occurs in the alignment material along the projection of each border between grooves and projections that form the concavo-convex pattern of the soft mold.

6. The fabricating method according to claim 1, wherein troughs and crests formed in the developed alignment material correspond to the concavo-convex pattern of the soft mold.

7. The fabricating method according to claim 1, wherein the ultraviolet radiation has a wavelength of about 250~340 nm.

8. The fabricating method according to claim 1, wherein the concavo-convex pattern comprises a plurality of grooves and projections, and a pitch of the grooves and projections is about 0.1 μm.

9. The fabricating method according to claim 1, wherein the alignment film is formed in an embossed shape having troughs and crests, and at least one of a distance between the troughs and a distance between the crests is about 40~100 nm.

10. The fabricating method according to claim 9, wherein a length from one of the troughs to the adjacent crest is about 1000~2000 Å.

11. A method of fabricating a liquid crystal display, the method comprising:
providing a first substrate with a plurality of layers disposed thereon;
spreading a photosensitive alignment material on the first substrate;
aligning a soft mold on the alignment material without being pressed, the soft mold having grooves and projections formed by a concavo-convex pattern made of a same material through an entire area of which ultraviolet radiation is transmitted;
irradiating an entire area of the alignment material with ultraviolet radiation through the entire area of the concavo-convex pattern of the soft mold, wherein the ultraviolet radiation travelling through borders between the grooves and the projections of the soft mold has an intensity lower than an intensity of the ultraviolet radiation travelling through other areas of the soft mold such that a portion of the alignment material exposed to the ultraviolet radiation passing through the borders between the grooves and the projections of the soft mold is developed to form crests and a remaining portion of the alignment material exposed to the ultraviolet radiation travelling through the other areas of the soft mold is developed to form troughs; and
curing the developed alignment material to form an alignment film;
providing a second substrate;
combining the first and second substrates to form a liquid crystal display, the liquid crystal display having liquid crystal disposed therein,
wherein each of the grooves of the soft mold has a flat shape in a horizontal direction and a predetermined constant depth in a vertical direction, each of the projections of the soft mold have a flat shape in the horizontal direction and a predetermined height in the vertical direction, and the predetermined constant depth is same as the predetermined height.

12. The fabricating method according to claim 11, wherein the first substrate is a color filter substrate and the second substrate is an array substrate.

13. The fabricating method according to claim 11, wherein the first substrate is an array substrate and the second substrate is a color filter substrate.

14. The fabricating method according to claim 11, further comprising partially curing the alignment material between spreading the alignment material on the first substrate and aligning the soft mold on the alignment layer.

15. The fabricating method according to claim 11, wherein different areas of the alignment material are exposed to different ultraviolet radiation intensities.

16. The fabricating method according to claim 15, wherein the different intensities are caused by an interference pattern of the ultraviolet radiation due to the difference between the index of refraction of the soft mold and air.

17. The fabricating method according to claim 16, further comprising selecting a soft mold with an index of refraction such that complete destructive interference of the ultraviolet radiation occurs in the alignment material along the projection of each border between grooves and projections that form the concavo-convex pattern of the soft mold.

18. The fabricating method according to claim 11, wherein troughs and crests formed in the developed alignment material correspond to the concavo-convex pattern of the soft mold.

19. The fabricating method according to claim 11, wherein the ultraviolet radiation has a wavelength of about 250~340 nm.

20. The fabricating method according to claim 11, wherein the concavo-convex pattern comprises a plurality of grooves and projections, and a pitch of the grooves and projections is about 0.1 μm.

21. The fabricating method according to claim 11, wherein the alignment film is formed in an embossed shape having troughs and crests, and at least one of a distance between the troughs and a distance between the crests is about 40~100 nm.

22. The fabricating method according to claim 12, wherein a length from one of the troughs to the adjacent crest is about 1000~2000 Å.

23. The fabricating method according to claim 1, wherein the troughs and the crests of the alignment film are curved.

24. The fabricating method according to claim 1, wherein the troughs and the crests of the alignment film have a pitch smaller than a pitch of the projections and the grooves of the concavo-convex pattern of the soft mold.

* * * * *